(12) United States Patent
Nakazawa et al.

(10) Patent No.: US 6,366,475 B2
(45) Date of Patent: *Apr. 2, 2002

(54) POWER CONTROL METHOD AND CIRCUIT, AND POWER SUPPLY UNIT

(75) Inventors: Shigeaki Nakazawa; Hidetoshi Yano; Shigeo Tanaka; Hidekiyo Ozawa, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,983

(22) Filed: Mar. 27, 2000

(30) Foreign Application Priority Data

Aug. 31, 1999 (JP) .............................. 11-246389

(51) Int. Cl.[7] .............................................. H02M 3/335
(52) U.S. Cl. .................................................. 363/21.01
(58) Field of Search ............................ 363/15, 16, 20, 363/21.01, 55, 56.01, 95, 97, 131

(56) References Cited

U.S. PATENT DOCUMENTS

| 4,672,226 A | * | 6/1987 | Sutherland ................... 307/43 |
| 4,777,575 A | | 10/1988 | Yamato et al. |
| 5,021,620 A | * | 6/1991 | Inumada ................... 219/10.55 |
| 5,157,594 A | * | 10/1992 | Glennon ....................... 363/41 |
| 5,373,205 A | * | 12/1994 | Busick et al. ................ 327/378 |
| 5,690,849 A | * | 11/1997 | De Vilbiss et al. .......... 219/497 |
| 5,699,239 A | * | 12/1997 | Komori ........................ 363/21 |

FOREIGN PATENT DOCUMENTS

| EP | 0 483 852 | 5/1992 |
| JP | 64-19966 | 1/1989 |
| JP | 7-107619 | 4/1995 |
| JP | 8-317642 | 11/1996 |
| JP | 11-18430 | 11/1999 |

OTHER PUBLICATIONS

Softbank Books, by a. Oshima, pp. 144–145, Dec. 10, 1997.

* cited by examiner

Primary Examiner—Matthew Nguyen
(74) Attorney, Agent, or Firm—Staas & Halsey LLP

(57) ABSTRACT

A power control circuit for controlling an output of a power supply is provided with a setting section which variably sets a maximum rated output based on input temperature information.

15 Claims, 8 Drawing Sheets

POWER CONTROL METHOD AND CIRCUIT, AND POWER SUPPLY UNIT

BACKGROUND OF THE INVENTION

1. Field of the Invention

The present invention generally relates to power control methods and circuits and power supply units, and more particularly to a power control method and circuit and a power supply unit which can set a rated output.

Electronic equipments such as portable or lap-top personal computers are designed so that it is possible to use a power supply unit such as an A.C. adapter as its power supply. The power supply unit is designed to satisfy a specification as a power supply, so that it is possible to supply a maximum power required by the electronic equipment.

Generally, the power supply unit such as the A.C. adapter supplies a predetermined output voltage and a predetermined output current, which are referred to as an rated output. The power supply unit guarantees that a serviceable life of the power supply unit, a temperature rise of the power supply unit and the like are within predetermined tolerable ranges even if the power supply unit is continuously used at the rated output.

2. Description of the Related Art

In the power supply unit such as the A.C. adapter, restrictions are introduced with respect to the size, cost and the like of the power supply unit, due to the need to guarantee continuous operation at the rated output. When continuously operating the power supply unit at the rated output, the temperature rise of the power supply unit caused by the heat generated from a power supply circuit within the power supply unit in particular becomes a problem.

On the other hand, when the operation of the electronic equipment such as the portable or lap-top personal computer is studied, a continuous operation at the rated output actually does not occur. For example, circuits within the portable or lap-top personal computer are made up of various circuit elements, but not all of these circuit elements operate constantly. The operation of the portable or lap-top personal computer is dependent upon the application program which is activated, and the circuits which operate within the lap-top personal computer differ from time to time depending on the application program which runs.

When the portable or lap-top personal computer is using its communication function such as connection to the internet and computer-to-computer communication, circuits related to a modem which connects the portable or lap-top personal computer to the telephone line operate, but the circuits related to the modem do not operate when the communication function is not used. Similarly, when the portable or lap-top personal computer is reading an application program or is reading or writing data by executing a program, circuits related to carrying out read and write with respect to a hard disk drive operate, but the circuits related to carrying out the read and write with respect to the hard disk drive do not operate when the program is carrying out numerical computations or is waiting for an input from an operator of the portable or lap-top personal computer.

Accordingly, a power consumption of the portable or lap-top personal computer changes every moment depending on the operation of the program, and compared to a maximum power consumption, an average power consumption of the portable or lap-top personal computer is considerably low. The average power consumption is on the order of approximately one-half the maximum power consumption.

In order to reduce the size, weight and cost of the A.C. adapter, for example, it is conceivable to define the rated power under which the A.C. adapter can continuously operate depending on the actual state of the power consumption of the portable or lap-top personal computer, as the rated output according to the specification of the A.C. adapter, so that it is possible to obtain from the A.C. adapter a power greater than the rated output for an extremely limited short time. However, when the A.C. adapter is constructed so that it is possible to obtain the power greater than the rated output, the time for which the power greater than the rated output is used cannot be limited by the design of the portable or lap-top personal computer which uses the A.C. adapter. In other words, the power used by the portable or lap-top personal computer depends greatly on the operating application program and the manner in which the portable or lap-top personal computer is used. As a result, it is virtually impossible to guarantee that the time for which the power greater than the rated output is used will be limited to an extremely short time. In addition, in a case where the portable or lap-top personal computer uses an A.C. adapter of a type different from the A.C. adapter which is originally designed for use with the portable or lap-top personal computer, it is impossible to limit the time for which the power greater than the rated output is used to the extremely short time.

No problem occurs even if the A.C. adapter is used at the rated output for a long period of time. However, when the A.C. adapter is used at the power greater than the rated output for a long period of time, the A.C. adapter abnormally generates heat due to the heat generated from the power supply circuit within the A.C. adapter. When the A.C. adapter abnormally generates heat, the A.C. adapter may break down or, the A.C. adapter may operate erroneously and cause the portable or lap-top personal computer which uses this A.C. adapter to operate erroneously or fail. In a worst case, the A.C. adapter may cause fire due to extreme heat. Therefore, even though it is possible to reduce the size, weight and cost of the A.C. adapter by the conceivable method described above, it is impossible to guarantee stable and sage operation of the A.C. adapter. Furthermore, the conceivable method is not practical in that the protection of the portable or lap-top personal computer which uses the A.C. adapter becomes insufficient.

According to the conventional power control method, the maximum power consumption of the electrical equipment which uses the power supply unit is obtained, by taking the above described problems into consideration, and the rated output of the power supply unit is set so that the power supply circuit within the power supply unit will not abnormally generate heat or break down even if the electronic equipment operates continuously for a long period of time at the maximum power consumption. This kind of power supply unit uses a switching regulator.

However, when the power supply unit is designed by taking into consideration the maximum power consumption of the electronic equipment, there is a problem in that it is difficult to reduce the size, weight and cost of the power supply unit. In addition, there is another problem in that it is impossible to guarantee the stable and safe operation of the power supply unit. Furthermore, there is still another problem in that it is impossible to sufficiently protect the electronic equipment which uses the power supply unit.

SUMMARY OF THE INVENTION

Accordingly, it is a general object of the present invention to provide a novel and useful power control method and circuit and power supply unit, in which the problems described above are eliminated.

Another and more specific object of the present invention to provide a power control method and circuit and a power supply unit, which can reduce the size, weight and cost of the power supply unit, guarantee stable and sage operation of the power supply unit, and sufficiently protect an electronic equipment which uses the power supply unit.

Still another object of the present invention is to provide a power control method for controlling an output of a power supply comprising a setting step variably setting a maximum rated output based on a temperature. According to the power control method of the present invention, an overload state exceeding a rated output is tolerated within a tolerable time, and a maximum tolerable rated output is reduced if the overload state continues for a time exceeding the tolerable time, so that an abnormal temperature rise of a power supply circuit can be positively prevented using a relatively simple construction.

An input to the power supply may be an A.C. input or a D.C. input, and the power control method may further comprise a converting step converting the A.C. or D.C. input to a D.C. output different from said input. In this case, it is possible to realize an A.C. adapter or a D.C. adapter which is compact and inexpensive, and also guarantee stable and safe operation.

A further object of the present invention is to provide a power control circuit for controlling an output of a power supply, comprising a setting section variably setting a maximum rated output based on input temperature information. According to the power control circuit of the present invention an overload state exceeding a rated output is tolerated within a tolerable time, and a maximum tolerable rated output is reduced if the overload state continues for a time exceeding the tolerable time, so that an abnormal temperature rise of a power supply circuit can be positively prevented using a relatively simple construction.

Another object of the present invention is to provide a power supply unit which converts an A.C. or D.C. input from a power supply to a D.C. output different from said input, comprising a power control circuit variably setting a maximum rated output based on input temperature information. According to the power supply unit of the present invention, an overload state exceeding a rated output is tolerated within a tolerable time, and a maximum tolerable rated output is reduced if the overload state continues for a time exceeding the tolerable time, so that an abnormal temperature rise of a power supply circuit can be positively prevented using a relatively simple construction.

Other objects and further features of the present invention may be apparent from the following detailed description when read in conjunction with the accompanying drawings.

DESCRIPTION OF THE PREFERRED EMBODIMENTS

Figure 1:
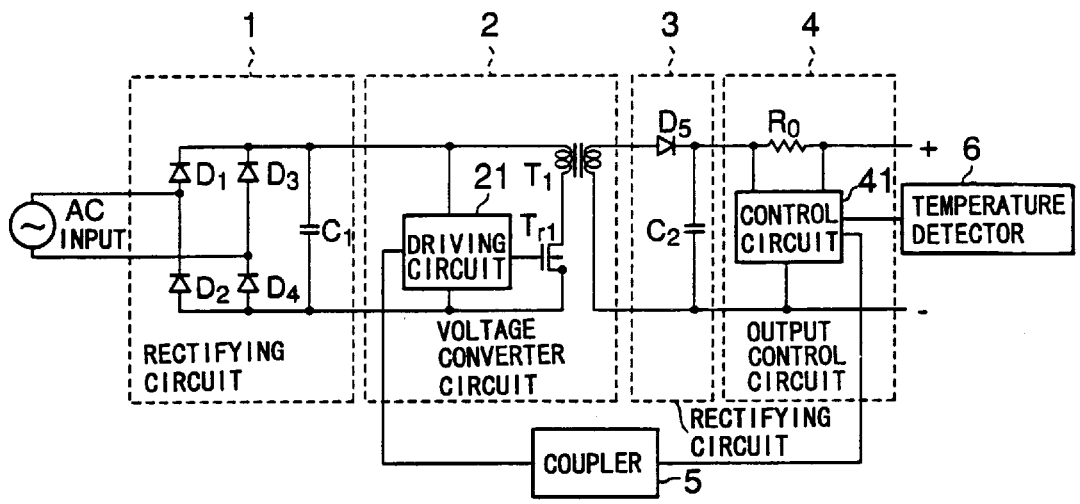
FIG. 1 is a diagram showing a first embodiment of a power supply unit according to the present invention.

A description will be given of embodiment of a power control method, a power control circuit and a power supply unit according to the present invention, by referring to the drawings.

FIG. 1 is a diagram showing a first embodiment of a power supply unit according to the present invention. This first embodiment of the power supply unit employs a first embodiment of a power control method according to the present invention and a first embodiment of a power control circuit according to the present invention. In this first embodiment, the present invention is applied to an A.C. adapter which converts an A.C. input into a D.C. output using a switching regulator.

In FIG. 1, an A.C. adapter includes a rectifying circuit 1 for rectifying a commercial A.C. input, a voltage converter circuit 2 for converting the A.C. input obtained via the rectifying circuit 1 into a D.C. output having a different voltage, a rectifying circuit 3 for rectifying the D.C. output obtained via the voltage converter circuit 2, an output control circuit 4 for controlling the D.C. output obtained via the rectifying circuit 3, a coupler 5 for feeding back a state of the D.C. output obtained via the rectifying circuit 3 to the voltage converter circuit 2, and a temperature detector 6 for detecting a temperature within the A.C. adapter.

The rectifying circuit 1 includes rectifying diodes D1 through D4, and a smoothing capacitor C1 for smoothing the rectified A.C. input, which are connected as shown in FIG. 1. The voltage converter circuit 2 includes a voltage converting transformer T1, a transistor Tr1 for switching ON/OFF a current flowing through the transformer T1, and a driving circuit 21 for controlling the ON/OFF state of the transistor Tr1, which are connected as shown in FIG. 1.

The rectifying circuit 3 includes a rectifying diode D5, and a smoothing capacitor C2 for smoothing a D.C. output which is obtained from the voltage converter circuit 2 and is rectified by the rectifying diode D5, which are connected as shown in FIG. 1. The output control circuit 4 includes a sense resistor R0 for detecting the D.C. output obtained via the rectifying circuit 3, and a power control circuit 41 for controlling an output current and an output voltage of the A.C. adapter, which are connected as shown in FIG. 1. This power control circuit 41 forms a setting section for variably setting a maximum rated output of the A.C. adapter based on temperature information.

The coupler 5 is made up of a known circuit which is provided to transmit a state of the output control on the secondary side of the transformer T1, of the voltage converter circuit 2 to the primary side of the transformer T1. This coupler 5 receives an output of the power control circuit 41. In order to isolate the primary side and the secondary side of the transformer T1, the coupler 5 uses a photocoupler, for example. As will be described later, the temperature detector 6 obtains temperature information by detecting the temperature within the A.C. adapter, and supplies the temperature information to the power control circuit 41 within the output control circuit 4. The temperature detector 6 simply needs to be provided within the A.C. adapter, and the location of the temperature detector 6 is not limited to a specific location within the A.C. adapter. However, it is desirable to provide the temperature detector 6 within the A.C. adapter at a location where heat is generated when circuits operate, that is, in a vicinity of the power control circuit 41.

Figure 2:
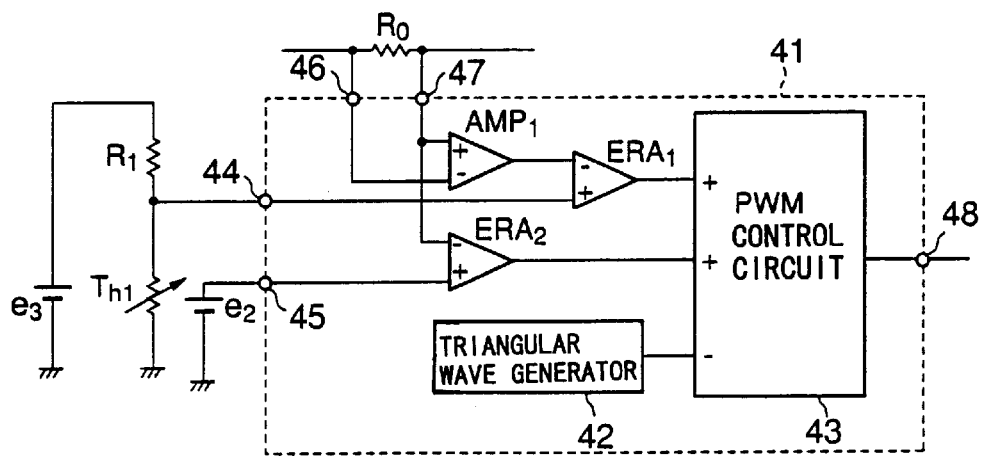
FIG. 2 is a diagram showing an embodiment of the construction of a power control circuit of the first embodiment.

FIG. 2 is a diagram showing an embodiment of the construction of the power control circuit 41 within the output control circuit 4 which is used in this first embodiment. The power control circuit 41 includes a voltage amplifier AMP1, error amplifiers ERA1 and ERA2, a triangular wave generator 42, a pulse width modulation (PWM) control circuit 43, and terminals 44 through 48 which are connected as shown in FIG. 2. In this embodiment, the power control circuit 41 is formed by a single semiconductor integrated circuit device, that is, a single semiconductor chip. This semiconductor chip may also include circuit elements of the rectifying circuits 1 and 3 and/or the voltage converter circuit 2.

The terminals 46 and 47 are respectively connected to terminals of the sense resistor R0, and to an inverting input terminal and a non-inverting input terminal of the voltage amplifier AMP1. The voltage amplifier AMP1 measures a voltage drop caused by a current flowing through the sense resistor R0, and outputs a voltage proportional to the current flowing through the sense resistor R0. The error amplifier ERA1 compares the output voltage of the voltage amplifier AMP1 input to the non-inverting input terminal and a reference voltage e3' input to the inverting input terminal, and inputs an output error voltage to the PWM control circuit 43. The reference voltage e3' input to the terminal 44 determines the output current of the A.C. adapter. This reference voltage e3' is obtained by voltage-dividing a reference voltage e3 from a reference voltage source e3 by a resistor R1 and a thermistor Th1. On the other hand, the error amplifier ERA2 compares a voltage from the terminal 47 input to the inverting input terminal and a reference voltage e2 from the terminal 45 input to the non-inverting input terminal, and inputs an output error voltage to the PWM control circuit 43. The reference voltage e2 input to the terminal 45 determines the output voltage of the A.C. adapter, and is obtained from a reference voltage source e2.

The PWM control circuit 43 has two non-inverting input terminals respectively input with the output error voltages of the error amplifiers ERA1 and ERA2, and one inverting input terminal input with a triangular wave voltage from the triangular wave generator 42. The PWM control circuit 43 is a kind of voltage comparator, and controls an ON-time of an output pulse width depending on the input voltages. An output pulse voltage of the PWM control circuit 43 is output from the terminal 48 and is input to the coupler 5 shown in FIG. 1.

In this embodiment, the rated output of the A.C. adapter is 16 V/3.0 A, and the output voltage of 16 V is determined by the reference voltage e2, while the output current of 3.0 A is basically determined by the reference voltage e3'. If it were assumed for the sake of convenience that the reference voltage e3' were fixed, the rated output current is limited to 3.0 A if the load of the electronic equipment or the like connected to the A.C. adapter assumes an overload state which requires an output current exceeding 3.0 A, and the output voltage of the A.C. adapter would decrease. Because the output voltage of the A.C. adapter decreases, the abnormal heat generation from the A.C. adapter is prevented in the overload state.

Figure 3:
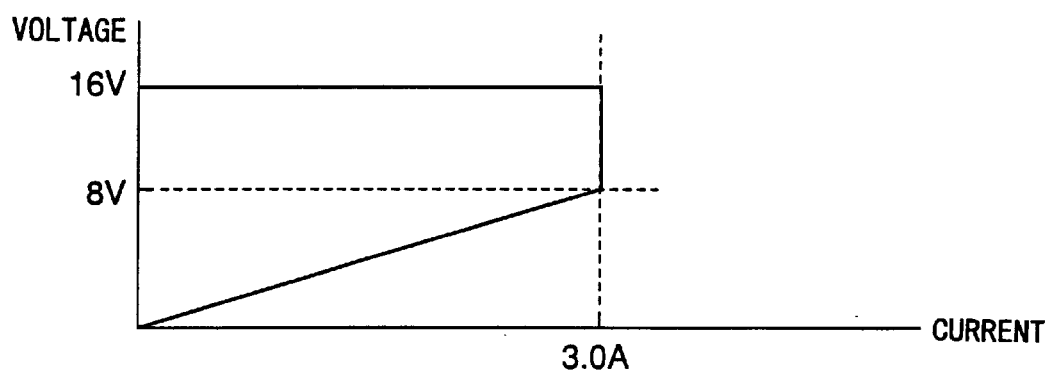
FIG. 3 is a diagram showing an output characteristic of an A.C. adapter for a case where a reference voltage which determines an output current of the A.C. adapter is fixed.
Figure 4:
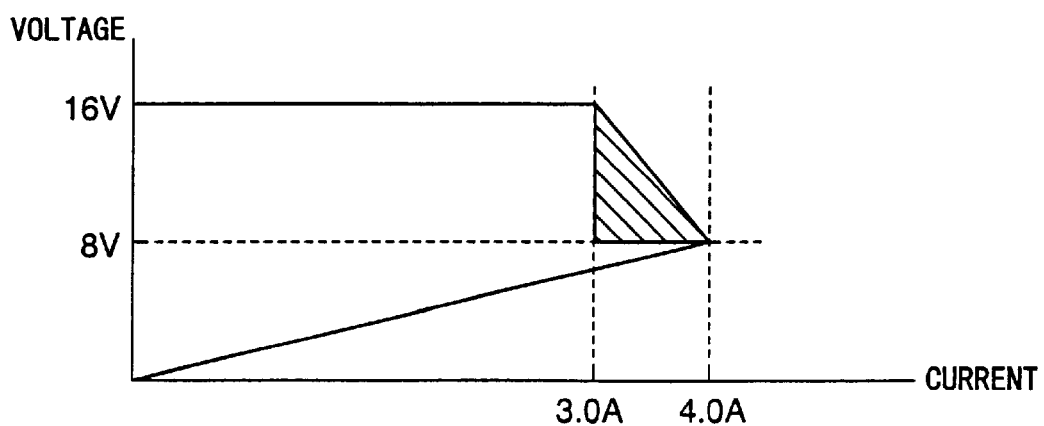
FIG. 4 is a diagram showing an output characteristic of the A.C. adapter having a region of an overload state.

However, if the reference voltage e3' were fixed, a maximum current consumable by the electronic equipment which uses the A.C. adapter would not be able to exceed 3.0 A, since the rated output of the A.C. adapter is 16 V/3.0 A. In the overload state exceeding 3.0 A, the output voltage of the A.C. adapter would decrease. Accordingly, an output characteristic of the A.C. adapter becomes as shown in FIG. 3 if the output current required by the load is 3.0 A or less. On the other hand, if the output current required by the load exceeds 3.0 A, a region of the overload state indicated by the hatching in FIG. 4 is generated. If the A.C. adapter were able to continuously operate for more than a predetermined time in this region of the overload state, the A.C. adapter would abnormally generate heat. In FIGS. 3 and 4, the ordinate indicates the output voltage of the A.C. adapter, and the abscissa indicates the output current of the A.C. adapter.

On the other hand, according to this first embodiment, the reference voltage e3' changes depending on the temperature within the A.C. adapter. The resistance of the thermistor Th1 changes depending on the temperature within the A.C. adapter. More particularly, the resistance of the thermistor Th1 becomes large when the temperature is low, and the resistance of the thermistor Th1 becomes small when the temperature is high. As a result, the reference voltage e3' which is obtained by voltage-dividing the reference voltage e3 by the resistor R1 and the thermistor Th1 becomes high when the temperature is low and becomes low when the temperature is high.

Figure 5:
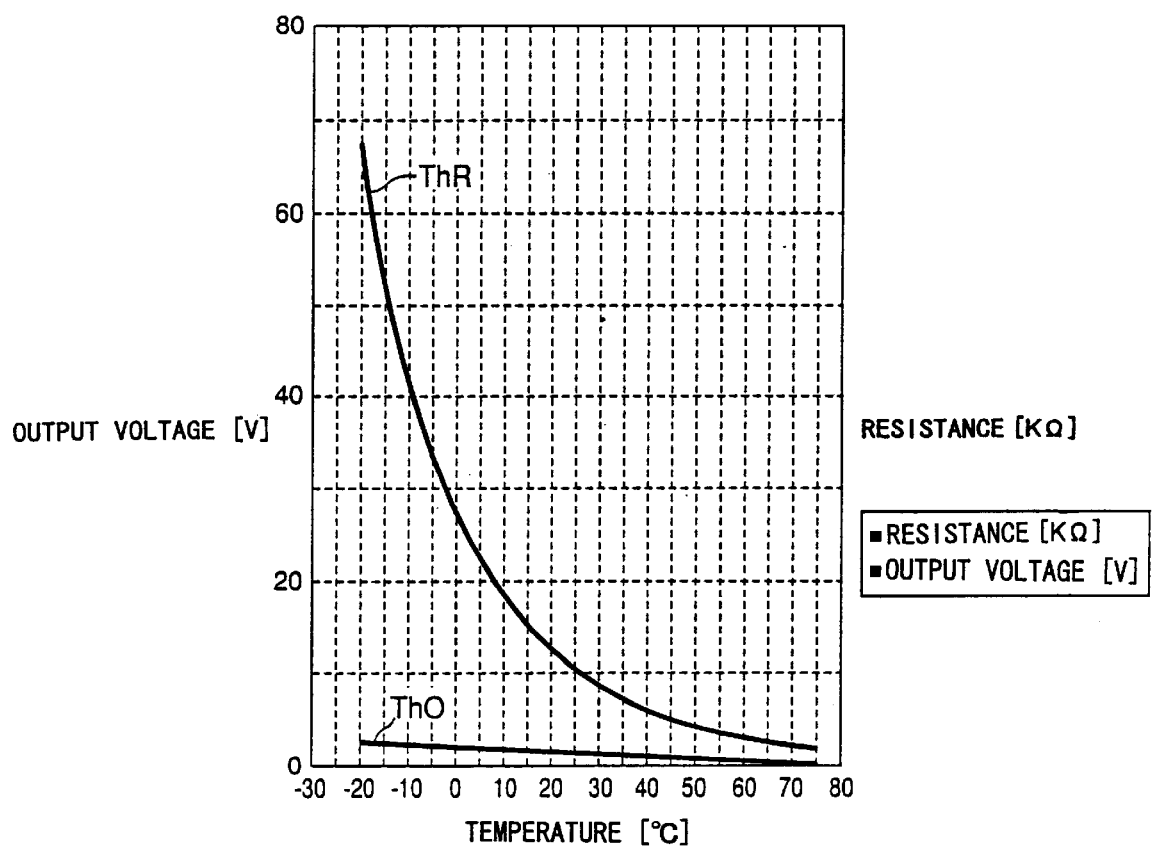
FIG. 5 is a diagram showing a resistance of a thermistor which changes depending on a temperature.

FIG. 5 is a diagram showing the resistance of the thermistor Th1 which changes depending on the temperature. More particularly, FIG. 5 shows the changes in a resistance ThR and an output voltage ThO of the thermistor Th1 with respect to the temperature change.

Figure 6:
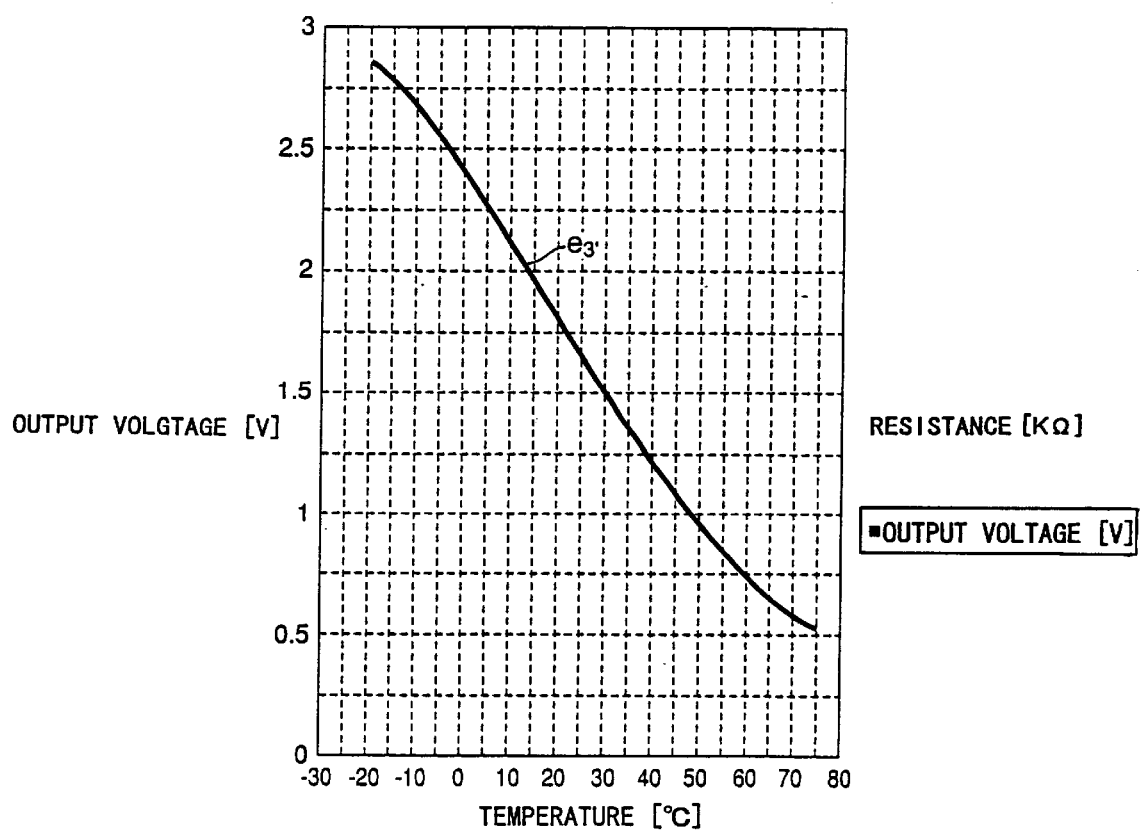
FIG. 6 is a diagram showing a change in a reference voltage which determines an output current of the A.C. adapter depending on a temperature change.

In addition, FIG. 6 is a diagram showing a change in the reference voltage e3' which determines the output current of the A.C. adapter, depending on the temperature change. In FIG. 6, the ordinate indicates the voltage, and the abscissa indicates the temperature.

Therefore, according to this first embodiment, the error amplifier ERA1 outputs a low voltage if the voltage drop at the sense resistor R0 is larger when compared with the reference voltage e3', and outputs a high voltage if the voltage drop is smaller when compared with the reference voltage e3'. Moreover, the error amplifier ERA2 outputs a low voltage if the voltage at the terminal of the sense resistor R0 connected to the terminal 47 is larger when compared with the reference voltage e2, and outputs a high voltage when the voltage at the terminal of the sense resistor R0 connected to the terminal 47 is smaller when compared with the reference voltage e2.

Figure 7:
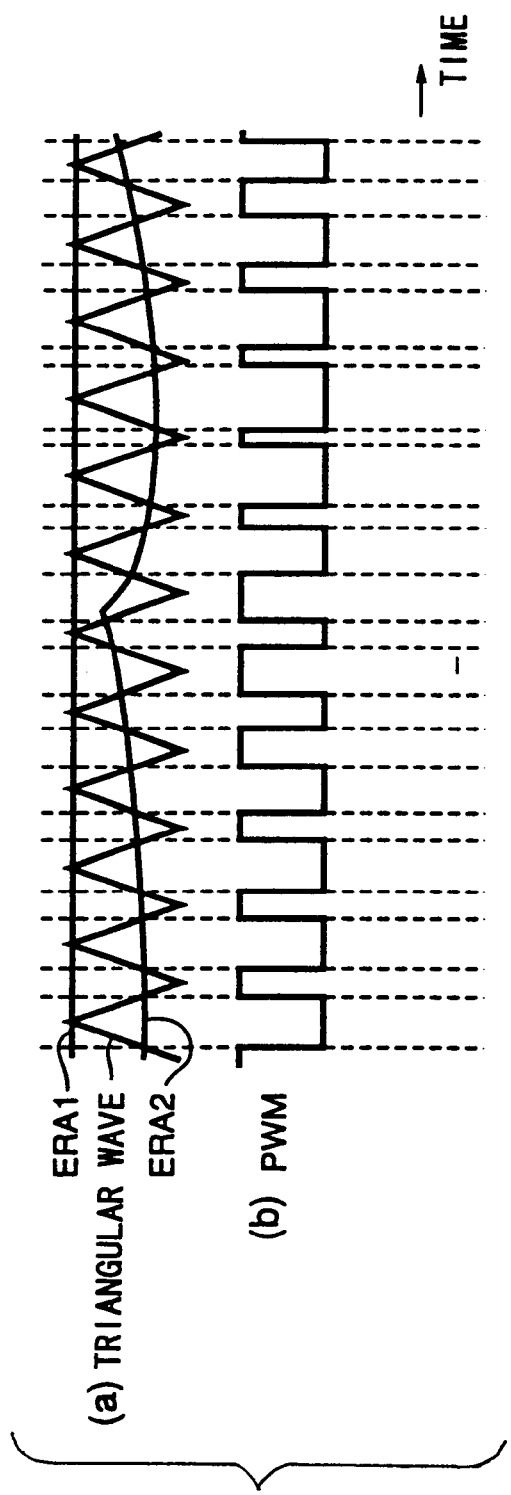
FIG. 7 is a diagram showing voltages input to a PWM control circuit when controlling an output voltage of the A.C. adapter.
Figure 8:
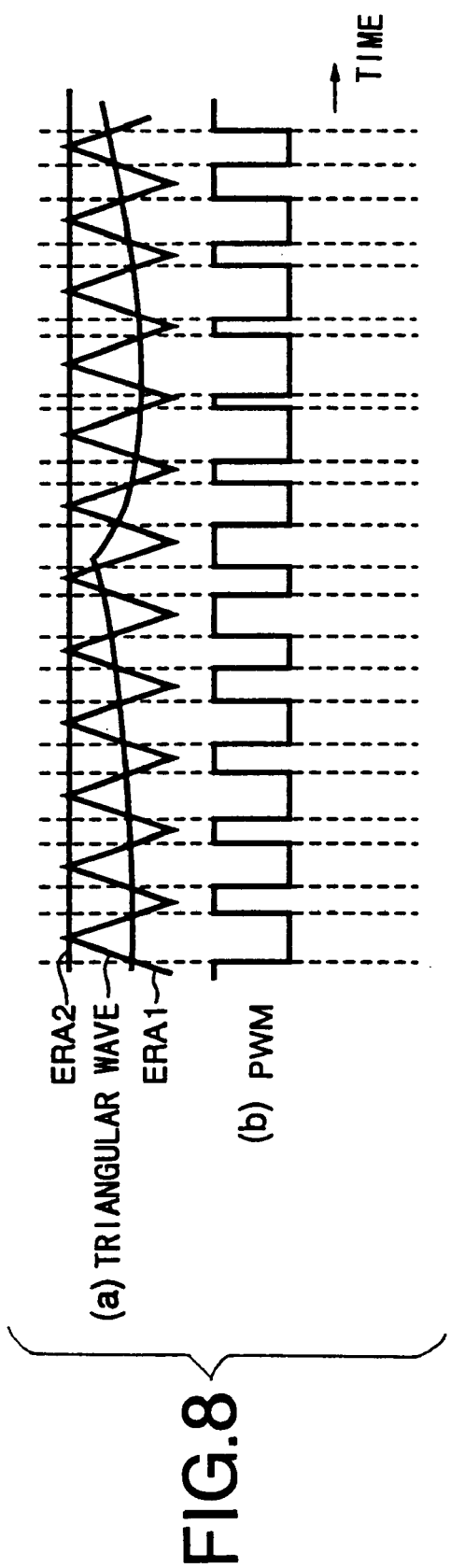
FIG. 8 is a diagram showing voltage input to the PWM control circuit when controlling an output current of the A.C. adapter.

Therefore, when controlling the output voltage of the A.C. adapter, output voltages ERA1 and ERA2 of the error amplifiers ERA1 and ERA2 and an output triangular wave voltage of the triangular wave generator 42 become as shown in FIG. 7($a$), and an output voltage PWM of the PWM control circuit 43 becomes a pulse voltage as shown in FIG. 7($b$). In addition, when controlling the output current of the A.C. adapter, the output voltages ERA1 and ERA2 of the error amplifiers ERA1 and ERA2 and the output triangular wave voltage of the triangular wave generator 42 become as shown in FIG. 8(a), and the output voltage PWM of the PWM control circuit 43 becomes a pulse voltage as shown in FIG. 8(b). In FIGS. 7 and 8, the ordinate indicates the amplitude of the voltage, and the abscissa indicates the time.

Consequently, when the temperature within the A.C. adapter is low, a maximum rated output current which is usable by exceeding the rated output current of the A.C. adapter increases. On the other hand, when the temperature within the A.C. adapter is high, the reference voltage e3' decreases with the temperature rise, and the output current of the A.C. adapter is limited based on the reference voltage e3'. Hence, when the temperature within the A.C. adapter is high, the maximum rated output current of the A.C. adapter decreases.

Figure 9:
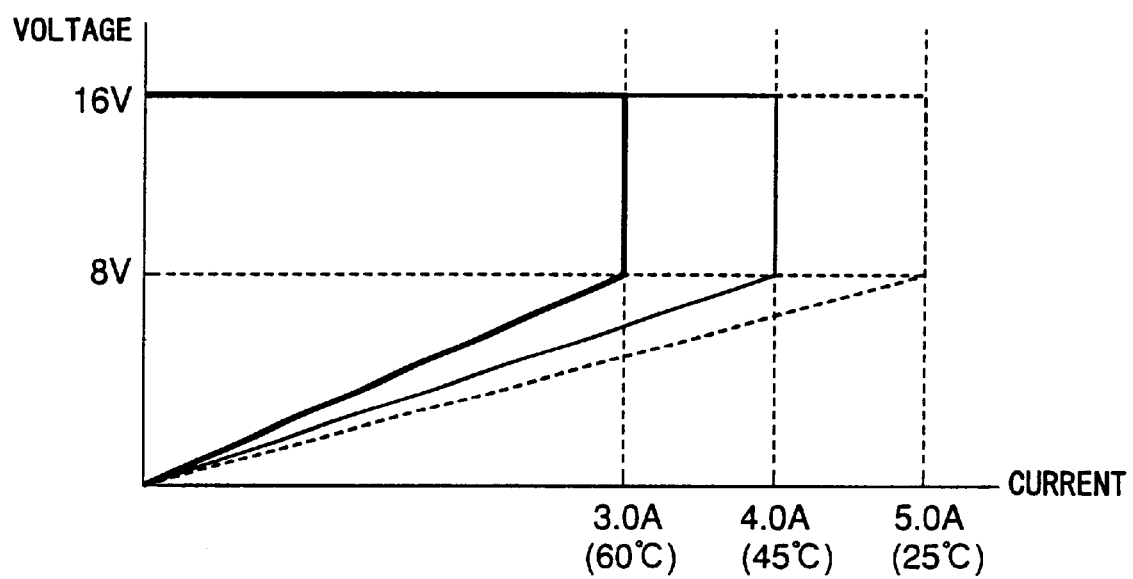
FIG. 9 is a diagram showing an output characteristic of the A.C. adapter in the first embodiment.

As a result, an output characteristic of the A.C. adapter becomes as shown in FIG. 9. In FIG. 9, the ordinate indicates the output voltage of the A.C. adapter, and the abscissa indicates the output current of the A.C. adapter. As described above, the rated output of the A.C. adapter is set in this embodiment, so that the rated output voltage is 16 V and the rated output current is 3.0 A. FIG. 9 indicates that the continuous operation of the A.C. adapter is guaranteed at this rated output, even when the temperature within the A.C. adapter is 60° C.

Furthermore, when the temperature within the A.C. adapter is 25° C., even though the original rated output is 16 V/3.0 A, this embodiment can tolerate a maximum rated current of up to 5.0 A, as the maximum rated output exceeding the rated output. When the A.C. adapter is continuously used at the maximum rated current of 5.0 A for a predetermined time and the temperature within the A.C. adapter rises 45° C., the maximum rated current which is tolerable with respect to the overload decreases to 4.0 A, so as to operate the A.C. adapter in a direction so as to decrease the temperature within the A.C. adapter. If the overload state of the A.C. adapter is eliminated in this state, the temperature rise within the A.C. adapter stops. On the other hand, if the overload state is not eliminated but still continues at the point in time when the temperature within the A.C. adapter rises to 45° C., the temperature within the A.C. adapter continues to rise, and the maximum rated current is limited to 3.0 A when the temperature within the A.C. adapter rises to 60° C. This state where the output current of the A.C. adapter is 3.0 A corresponds to the rated output state, and for this reason, the temperature within the A.C. adapter will not rise above 60° C.

According to this embodiment, the maximum rated current is variably set depending on the temperature within the A.C. adapter. Hence, even if the overload state exceeding the rated current continues within a tolerable time, the maximum rated current of the A.C. adapter is maintained. On the other hand, if the overload state continues exceeding the tolerable time, the maximum rated current is automatically decreased, so that the temperature within the A.C. adapter will not increase abnormally.

In this embodiment and each of the embodiments described later, the thermistor Th1 is used as the temperature detector 6. However, the temperature detector 6 is of course not limited to the thermistor Th1, and any suitable element or device capable of detecting the temperature may be used as the temperature detector 6. For example, a thermocouple which uses the Seebeck effect, may be used as the temperature detector 6.

Next, a description will be given of a second embodiment of the power supply unit according to the present invention. This second embodiment of the power supply unit employs a second embodiment of the power control method according to the present invention and a second embodiment of the power control circuit according to the present invention. In this second embodiment, the present invention is also applied to an A.C. adapter which converts an A.C. input into a D.C. output using a switching regulator.

Figure 10:
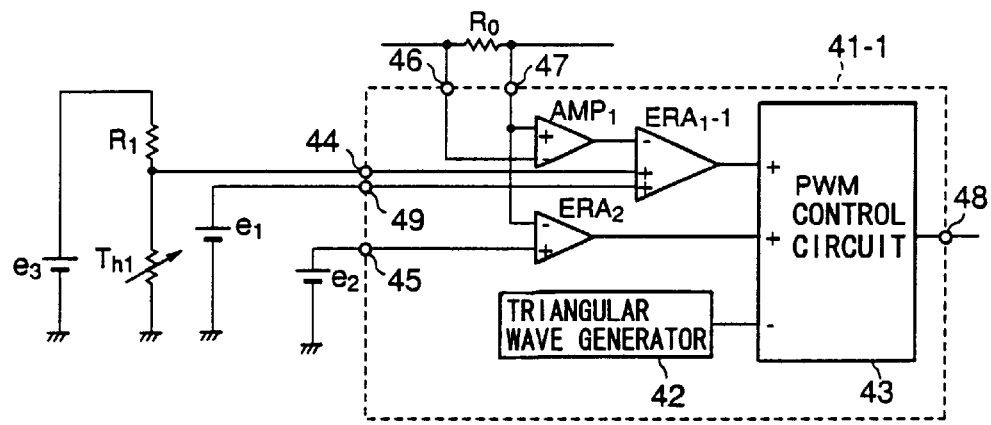
FIG. 10 is a diagram showing an embodiment of the construction of a power control circuit in a second embodiment of the power supply unit according to the present invention.

The basic construction of this second embodiment of the power supply unit is the same as that of the first embodiment shown in FIG. 1, and a description and illustration thereof will be omitted. In this second embodiment, a power control circuit 41-1 shown in FIG. 10 is used in place of the power control circuit 41 shown in FIG. 2. In FIG. 10, those parts which are the same as those corresponding parts in FIG. 2 are designated by the same reference numerals, and a description thereof will be omitted.

As shown in FIG. 10, the power control circuit 41-1 of this second embodiment further includes a terminal 49, and uses a 3-input error amplifier ERA1-1 in place of the error amplifier ERA1 shown in FIG. 2. A reference voltage e1 is input to the terminal 49, and this reference voltage e1 is input to a second non-inverting input terminal of the error amplifier ERA1-1. Hence, in the error amplifier ERA1-1, the reference voltage e3' is used for the comparison with the output voltage of the voltage amplifier AMP1 when the reference voltage e3' is lower than the reference voltage e1, and the reference voltage e1 is used for the comparison with the output voltage of the voltage amplifier AMP1 when the reference voltage e3' is higher than the reference voltage e1. The output voltage of the voltage amplifier AMP1 which generates a voltage proportional to the current flowing through the sense resistor R0 is input to the inverting input terminal of the error amplifier ERA1-1. As a result, the output current dependent on the reference voltages input to the non-inverting input terminals of the error amplifier ERA1-1 becomes the output current of the A.C. adapter.

Therefore, when the temperature within the A.C. adapter is low, the maximum rated output current usable exceeding the rated output current of the A.C. adapter becomes large, but it limited to a current determined by the reference voltage e1 at a certain temperature. On the other hand, when the temperature within the A.C. adapter is high, the reference voltage e3' decreases with the temperature rise, and the output voltage of the A.C. adapter is limited based on the reference voltage e3', thereby making the maximum rated output current of the A.C. adapter small. Consequently, the output characteristic of the A.C. adapter becomes as shown in FIG. 9, similarly to the first embodiment described above.

Next, a description will be given of a third embodiment of the power supply unit according to the present invention. This third embodiment of the power supply unit employs a third embodiment of the power control method according to the present invention and a third embodiment of the power control circuit according to the present invention. In this third embodiment, the present invention is applied to a D.C. adapter which converts a D.C. input to a D.C. output different from the D.C. input.

Figure 11:
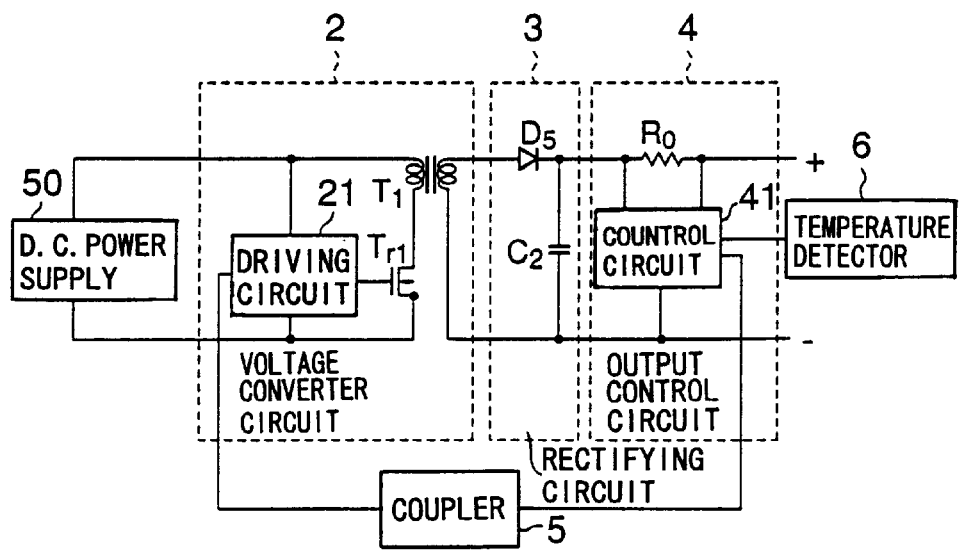
FIG. 11 is a diagram showing a third embodiment of the power supply unit according to the present invention.

FIG. 11 is a diagram showing the third embodiment of the power supply unit. In FIG. 11, those parts which are the same as those corresponding parts in FIG. 1 are designated by the same reference numerals, and a description thereof will be omitted. In this third embodiment, the D.C. input is obtained from a D.C. power supply 50 such as an automobile battery. This D.C. input is input directly to the voltage converter circuit 2. Hence, a D.C. output different from the D.C. input is obtained form the output control circuit 4. In other words, this third embodiment basically has the same construction as the first embodiment described above, except that the rectifying circuit 1 shown in FIG. 1 is omitted in this third embodiment.

Further, the present invention is not limited to these embodiments, but various variations and modifications may be made without departing from the scope of the present invention.

What is claimed is:

1. A power control method for controlling an output of a power supply comprising:

a setting step variably setting a maximum rated output within a tolerable time in which an overload state with respect to the power supply is tolerated, based on a temperature.

2. The power control method as claimed in claim 1, wherein an input to the power supply is an A.C. input or a D.C. input, and further comprising:

a converting step converting the A.C. or D.C. input to a D.C. output different from said input.

3. The power control method as claimed in claim 1, wherein said setting step variably sets a maximum rated current based on the temperature.

4. A power control circuit for controlling an output of a power supply, comprising a setting section variably setting a maximum rated output within a tolerable time in which an overload state with respect to the power supply is tolerated, based on input temperature information.

5. The power control circuit as claimed in claim 4, wherein an input to the power supply is an A.C. input or a D.C. input, and further comprising:

a control circuit converting the A.C. or D.C. input to a D.C. output different from said input.

6. The power control circuit as claimed in claim 4, wherein said setting section variably sets a maximum rated current based on the input temperature information.

7. The power control circuit as claimed in claim 4, wherein said setting section variably sets the maximum rated output based on the input temperature information and reference information, said reference information indicating a rated value of an output current and/or an output voltage.

8. A power supply unit which converts an A.C. or D.C. input from a power supply to a D.C. output different from said input, comprising:

a power control circuit variable setting a maximum rated output within a tolerable time in which an overload state with respect to the power supply is tolerated, based on input temperature information.

9. The power supply unit as claimed in claim 8, wherein said power control circuit variably sets a maximum rated current based on the input temperature information.

10. The power supply unit as claimed in claim 8, wherein said power control circuit variably sets the maximum rated output based on the input temperature information and reference information, said reference information indicating a rated value of an output current and/or an output voltage of the power control circuit.

11. The power supply unit as claimed in claim 8, further comprising:

a temperature detector detecting a temperature and inputting the input temperature information to said power control circuit.

12. The power control method as claimed in claim 2, wherein said setting step variably sets a maximum rated current based on the temperature.

13. The power supply unit as claimed in claim 9, further comprising:

a temperature detector detecting a temperature and inputting the input temperature information to said power control circuit.

14. The power supply unit as claimed in claim 10, further comprising:

a temperature detector detecting a temperature and inputting the input temperature information to said power control circuit.

15. A method to control an output of a power supply comprising:

variably setting a maximum rated output within a tolerable time in which an overload state with respect to the power supply is tolerated, based on a temperature.

* * * * *

UNITED STATES PATENT AND TRADEMARK OFFICE
CERTIFICATE OF CORRECTION

PATENT NO. : 6,366,475 B2
DATED : April 2, 2002
INVENTOR(S) : Shigeaki Nakazawa et al.

It is certified that error appears in the above-identified patent and that said Letters Patent is hereby corrected as shown below:

Column 10,
Line 6, change "variable" to -- variably --.

Signed and Sealed this

Fourth Day of June, 2002

*Attest:*

*Attesting Officer*

JAMES E. ROGAN
*Director of the United States Patent and Trademark Office*